United States Patent [19]

Kapgan et al.

[11] Patent Number: 5,779,281

[45] Date of Patent: Jul. 14, 1998

[54] FORMING A CONNECTION TO AN OBJECT

[75] Inventors: Michael I. Kapgan, Foster City; Richard H. Kosarchuk, Fremont, both of Calif.

[73] Assignee: Advanced Metal Components, Inc., Menlo Park, Calif.

[21] Appl. No.: 927,296

[22] Filed: Sep. 11, 1997

Related U.S. Application Data

[63] Continuation of Ser. No. 423,506, Apr. 17, 1995, abandoned.

[51] Int. Cl.$^6$ .................................................. F16L 55/00
[52] U.S. Cl. .............................. 285/148.19; 285/381.2; 285/382.7
[58] Field of Search ........................... 285/381.1, 381.2, 285/381.4, 148.19, 382.7

[56] References Cited

U.S. PATENT DOCUMENTS

| | | | |
|---|---|---|---|
| 3,423,518 | 1/1969 | Weagant | 285/381.5 X |
| 3,484,123 | 12/1969 | van der Velden | 285/341 |
| 3,753,700 | 8/1973 | Harrison et al. | 75/175.5 |
| 4,035,007 | 7/1977 | Harrison et al. | 385/381.2 |
| 4,135,743 | 1/1979 | Hughes | 285/381.2 X |
| 4,226,448 | 10/1980 | Broyles | 285/381.2 X |
| 4,711,473 | 12/1987 | Glover | 285/381.4 X |
| 4,770,725 | 9/1988 | Simpson et al. | 148/402 |
| 4,934,743 | 6/1990 | Kapgan et al. | 285/23 |
| 5,028,081 | 7/1991 | Fournier | 285/381.3 X |
| 5,058,936 | 10/1991 | Kapgan et al. | 285/382 |

FOREIGN PATENT DOCUMENTS 3234997  10/1991  Japan.

*Primary Examiner*—Dave W. Arola
*Attorney, Agent, or Firm*—Baker, Maxham, Jester & Meador

[57] ABSTRACT

The present invention provides a technique for forming a connection to an object (26) with a shape memory alloy sleeve (4). In the preferred embodiment, the sleeve (4) has a first end (10) with formations on its internal surface for forming a seal with the external surface of an object (26) located within it, and a second end which has a predetermined configuration when recovered in which it can form a connection to another object (30) for engaging the other object (30) to form a connection to that object (30).

37 Claims, 2 Drawing Sheets

FORMING A CONNECTION TO AN OBJECT

This application is a continuation of application Ser. No. 08/423,506, filed Apr. 17, 1995, now abandoned.

BACKGROUND OF THE INVENTION

The prior art includes methods for making a mechanical connection to an object by attaching a collar to the external surface of the object, through which force can be applied to the object in a direction parallel to the surface. This connection technique is used in particular to connect elongated objects which have a constant cross-section to one another. Objects with a constant cross-section include tubes, pipes, and rods. For example, U.S. Pat. No. 3,484,123 discloses a tube coupling assembly which comprises a collar rigidly fixed to a first tube by swaging, and a union member rigidly fixed to a second tube, also by swaging; the subject matter disclosed in U.S. Pat. No. 3,484,123 is incorporated in the specification of the present application by reference. The union member extends beyond the end of the second tube and has a threaded external surface. The assembly includes a nut which has a radially inwardly projecting flange at one end which abuts the collar, and which is threaded internally at its other end for engaging the threaded surface of the union member, so that rotation of the nut relative to the union member forces the two tubes towards one another.

More recently, it has been proposed to use a collar formed from a shape memory alloy in order to avoid the need to swage an object or to form a weld, in order to join a collar to the object. Shape memory alloys exhibit a shape memory effect as a result of their ability to transform between martensite and austenite phases. The transformation can be caused by a change in temperature; for example, a shape memory alloy in the martensite phase will begin to transform to the austenite phase when its temperature increases to a temperature greater than $A_s$, and the transformation will be complete when the temperature exceeds $A_f$. The reverse transformation will begin when the temperature of the alloy is decreased to a temperature less than $M_s$ and will be complete when the temperature is less than $M_f$. The temperatures $M_s$, $M_f$, $A_s$, and $A_f$ define the thermal transformation hysteresis loop of a shape memory alloy. An article may be formed in a desired configuration while in its austenite phase. If it is then cooled so that it transforms to the martensite phase, it can then be deformed by up to about 8%. Substantially all of the strain imparted to the article is recovered when the article is subsequently heated so that it transforms back to the austenite phase. Further information on the properties of shape memory alloys is available from the article by L. M. Schetky in *Scientific American*, Volume 241, pages 68 to 76 (1979), entitled "Shape Memory Alloys."

The use of a shape memory alloy in an assembly for forming a connection has been disclosed in U.S. Pat. No. 4,934,743. In this patent, the collar is caused to shrink onto the end of an object so that the object can be connected to another object by means of a union member and a nut, in the manner disclosed in U.S. Pat. No. 3,484,123 referred to above. The subject matter disclosed in U.S. Pat. No. 4,934,743 is incorporated in the specification of the present application by reference.

While the assembly disclosed in U.S. Pat. No. 4,934,743 makes it possible to take advantage of the reliability and convenience of a shape memory alloy in the formation of the connection between the collar and one of the objects to be joined, it is still necessary to connect the union member to the other of the objects. A particular problem is that the dimensions of the union member, at the end to which a connection is made to the nut, must be controlled very accurately, so that the connection (generally formed by interengaging screw threads) is formed reliably. This is not consistent with the formation of the union member from a material which is designed specifically to be used in such a way so that the dimensions of the member change.

SUMMARY OF THE INVENTION

In the preferred embodiment, the present invention is directed to forming a connection to an object, and more particularly, (1) to a device for forming the connection, (2) to a method of forming a connection to an elongated object, and (3) to an object to which a connection has been made.

The present invention provides a technique for forming a connection to an object with a shape memory alloy sleeve. This sleeve could be a union member of the type used in an assembly such as that disclosed in U.S. Pat. No. 3,484,123. In the preferred embodiment, the sleeve has a first end with formations on its internal surface for forming a seal with the external surface of an object located within it, and a second end which has a predetermined configuration when recovered in which it can form a connection to another object for engaging the other object to form a connection to that object. This other object is usually a mating connector component such as a nut of the type used in an assembly such as that disclosed in U.S. Pat. No. 3,484,123. The sleeve is arranged so that its second end can shrink completely to its fully recovered predetermined configuration, while the first end is restrained from shrinking completely by the engagement of the formations at that end with the object located in the sleeve.

Accordingly, in one embodiment, the invention provides a method of forming a connection to an elongated object, which includes several steps. First, an object and a device, which comprises a sleeve formed from a shape memory alloy, is provided. The sleeve is transversely heat-shrinkable towards a recovered configuration and has (1) a first end with formations on its internal surface for forming a seal with the external surface of the object and (2) a second end which has a predetermined configuration when recovered in which it can form a connection to another object. Second, the object is positioned so that its end is located within the first end of the sleeve. Third, the temperature of the sleeve is increased to a temperature above the $A_s$ temperature of the alloy. This causes the sleeve to shrink transversely so that the end of the object located within the first end of the sleeve restricts the shrinkage of the sleeve at that end so that the formations on the internal surface of the sleeve engage the external surface of the object and form a seal between the sleeve and the object. After completion of the shrinkage, the second end of the sleeve has the predetermined configuration.

These and other advantages will become apparent to those skilled in this art upon a reading of the following detailed description of the invention, which should be taken in conjunction with the accompanying drawings.

DESCRIPTION OF THE PREFERRED EMBODIMENT

Figure 1:
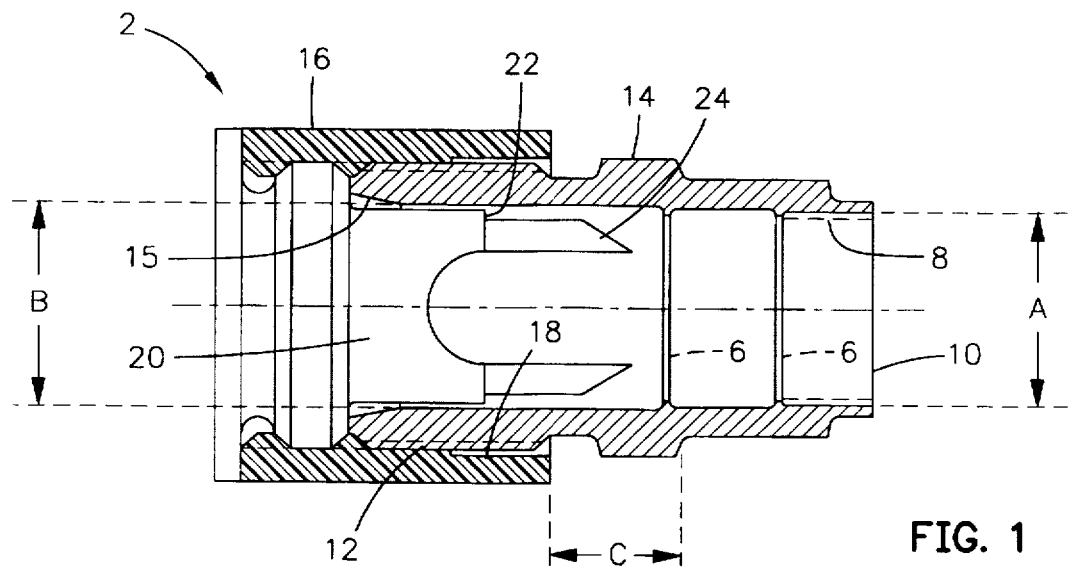
FIG. 1 is a transverse view, partially in section, through a device according to the invention, prior to installation.

It has been found that the dual functions of a union member in a connector of the type disclosed in U.S. Pat. Nos. 3,484,123 and 4,934,743 can be provided by a device which comprises a shape memory alloy sleeve. The first end of the sleeve, provided with formations to form a seal to an object inserted into the sleeve at that end, can shrink transversely so that the seal is formed by the formations. That shrinkage does not involve full recovery to the configuration that the sleeve would adopt in the absence of the object; the restrained recovery ensures that a force is exerted by the sleeve on the object, giving rise to the seal. It is in this way that the benefits of using a shape memory alloy component can be achieved in the union member.

The technique of the present invention can also ensure that a secure connection is made between the device of the invention and another component. This can be done by using formations appropriate for engaging formations provided on the sleeve at the second end (especially on the outer surface of the sleeve). An example of this is an internally threaded nut. This is achieved by arranging for the sleeve to shrink at the second end substantially to the configuration that the sleeve would adopt in the absence of any internal restraint to shrinkage. It has been found that this can make it possible for a reliable and secure connection to be made between the sleeve and another component. This is done, for example, by interengaging threads.

When the device of the invention is intended to be used as a union member in a tube coupling assembly, it can conveniently be provided with an axially facing surface for cooperating with an axially facing surface on a collar that is provided on another object. The nut can act against the collar to transmit force to that object when connected to the sleeve of the device of the invention through the formations at the second end. That collar can conveniently have the features referred to in U.S. Pat. No. 4,934,743. An axially facing surface on the collar of the device may be perpendicular to the axis of an object that is to be connected using the device. Arranging the surface so that it is substantially perpendicular to the axis allows the axial force applied to an object through the sleeve to be maximized. However, arranging the surfaces so that they are not perpendicular allows a force to be applied to a collar on another object, thus enhancing the seal between that collar and its respective object. The sleeve can have an axially facing surface on its outer surface, directed towards the first end of the sleeve, which a nut member can act against to urge the sleeve in a direction away from the said first end. The nut member can then cooperate with a mating connector component to form a connection.

In a preferred arrangement, the transverse internal dimension of the sleeve is greater at the second end than at the first end when the sleeve is in its fully unrestricted recovered configuration, and when the sleeve is in the configuration prior to the deformation step by which the shape memory properties are imparted to the sleeve. The relative transverse dimensions can be arranged by removal of material from the internal surface of the sleeve, preferentially at the second end of the sleeve. This results in a reduction in wall thickness in the sleeve at the second end, preferably in the region of the sleeve on which formations are provided for connection to another object (e.g., the thread on a nut). In the configuration of the sleeve when it is fully recovered (i.e., without internal restraint), the reduction in wall thickness will generally be associated with an increase in internal transverse dimension at the second end of the sleeve, compared with the internal dimension at the first end.

The increase in internal transverse dimension at the second end of the sleeve compared with the first end, which might arise from a variation in wall thickness, has several advantages. For example, it makes it possible for the sleeve to recover completely at the second end while recovering only partially at the first end to give an effective seal to an object inserted into the sleeve, while the spacing between the first and second ends of the sleeve (and therefore the overall length of the sleeve) is kept to a minimum. This can give rise to advantages in terms of space and weight savings along with a reduction in cost.

A further advantage that arises from the variation in internal transverse dimension is that it facilitates the insertion of the end portion of another object into the sleeve from the second end. This allows for connection to the object already inserted into the first end, onto which the sleeve has been made to shrink.

In another aspect, the invention provides a device for forming a connection to an elongated object, comprising a sleeve which is formed from a shape memory alloy. The sleeve is transversely heat-shrinkable towards a recovered configuration, and the sleeve has (1) a first end with formations on its internal surface for forming a seal with the external surface of an object located within the sleeve, and (2) a second end which has a predetermined configuration when recovered in which it can form a connection to another object. The degree of shrinkage available in the second end of the sleeve, prior to causing the sleeve to shrink, is less than in the first end of the sleeve.

Preferably, the ratio of the internal dimensions of the sleeve at the second end to that at the first end, when the sleeve is fully recovered (i.e., without constraint) is at least approximately 1.04, and more preferably at least approximately 1.10. When the sleeve is non-circular in the cross-section view, the internal cross-sections are compared at points where the cross-sectional configurations correspond. For example, on the major or minor axes when the sleeve has an elliptical cross-section. Preferably, the thickness of the wall at the first end is greater than that at the second end by at least approximately 6%, and more preferably at least approximately 9%.

In the preferred embodiment, the device includes an internally projecting stop within the sleeve. In this configuration, the method includes the step of locating the end of the object against the stop. This makes it possible to prevent inhibition of recovery of the second end of the sleeve by the object inserted into the sleeve, by preventing over-insertion of the object into the sleeve from the first end. When the stop is located a sufficient distance from the second end of the sleeve, it is possible to ensure that the second end of the sleeve shrinks freely to the fully recovered configuration of the sleeve at that end, even when the transverse internal dimension of the sleeve is no greater at the second end than at the first end, in the manner set forth above.

The stop can be provided by a transversely compressible member. For example, a split ring-shaped member can be located positively axially within the sleeve. Furthermore, a groove or other formation can be arranged in the internal wall of the sleeve, in which a compressible member can be received. The member can be split so that its transverse dimension can reduce as the sleeve is heated and caused to shrink transversely. When the transversely compressible member is retained within the sleeve after installation of the device on an object, it will generally be provided with an aperture extending through it, through which fluid can flow. This makes it possible for fluid to flow through the device when it is used to connect fluid carrying tubes, without significant impediment by the transversely compressible member.

A transversely compressible member might be located with respect to appropriate formations provided on the internal wall of the sleeve. For example, it might be located in the groove, which can conveniently be continuous, and it might be for example circular or helical depending on the configuration of the member.

The device of the present invention can include a cap located on the sleeve at its second end. The cap can be located on the sleeve by means of formations on the second end of the sleeve. An end cap can eliminate or at least reduce the ingress of foreign material into the sleeve from the second end. Such foreign material can adversely affect the seal that is provided by means of the formations at the first and second ends of the sleeve. The effect of such foreign material can be particularly adverse if it affects the seal provided by the formations at the first end of the sleeve, which often have to withstand high pressure in fluid being conveyed in the tubes to be connected. The connection of the cap to the sleeve by means of formations at the second end of the sleeve can make it possible for the cap to be released automatically from the sleeve when the sleeve is installed on an object by shrinkage.

In the preferred embodiment, the cap includes at least one member which extends into the sleeve, from the second end of the sleeve. Such a member on the cap can provide a stop which is engaged by the end of an object inserted into the sleeve from the first end thereof, such that the sleeve can be located relative to the end of such an object. In this configuration, the method of the invention includes the step of locating the end of the object against the end of the member within the sleeve.

The member on the cap can be provided with at least two fingers which can be deformed transversely to engage a circumferentially (this term is to be applied to non-circular objects just as it is to circular objects) extending surface of an object inserted into the sleeve from the first end thereof. Such fingers can be inwardly deformable to be received within a hollow object inserted into the sleeve from its first end, to engage the internal surface of the object. The ends of the fingers can be provided with an appropriate chamfer to facilitate deformation of the fingers when engaged by the end of the inserted object.

In a further embodiment, the invention provides a device for forming a connection to an elongated object. This device includes a sleeve and an end cap. The sleeve is formed from a shape memory alloy and is transversely heat-shrinkable towards a recovered configuration. The sleeve also has a first end with formations on its internal surface for forming a seal with the external surface of an object located within the sleeve, and a second end which has a predetermined configuration when recovered in which it can form a connection to another object. Finally, the sleeve has formations at the second end by which the connection to the other object can be made. The end cap is located on the sleeve at its second end, and it is retained on the sleeve by means of the formations on the end cap which engage the formations on the second end of the sleeve.

A cap having some or all of the features referred to above can give rise to a number of advantages. The fact that it closes the second end of the sleeve means that the sleeve of the invention cannot be placed on the end of an object other than with the correct orientation. This reduces the likelihood of having to dispose of at least one of the sleeve and the object to which it is connected after incorrect installation.

Provided that the connection between the cap and the sleeve (the connection being made with the formations on the second end of the sleeve), is sufficiently secure, the cap can make it possible to manipulate the sleeve without having to contact the sleeve directly. This can have particular advantages when the transformation temperatures of the sleeve alloy are such that the sleeve is supplied for installation in a cryogenic fluid (often liquid nitrogen), and when the installation is made by allowing the sleeve's temperature to increase from the temperature of the fluid to ambient temperature. The cap can be made from materials with a relatively low heat capacity, making it possible for the device to be manipulated with little or nothing in the way of tools or insulating gloves. The cap can reduce the likelihood of damage to the sleeve, especially to the formations at the second end thereof, by providing a measure of physical protection for the sleeve.

A cap which includes an inwardly directed member with fingers to engage the object inserted from the first end gives rise to particular advantages when the object is oriented such that the sleeve has a tendency to fall off or otherwise be misplaced relative to the end of the object. For example, the object might be directed downwardly. In this arrangement, the device of the present invention may have a tendency to drop off the end of the object. This would occur after the device is positioned on the object, but before the sleeve has been made to shrink to engage the object, which can be reduced by the engagement provided by the fingers on the member. This makes it possible to take advantage of one of the principal benefits of a shape memory alloy component. For example, installation in environments with restricted space is possible. This includes installation of a connector when techniques such as swaging or welding are difficult or impossible.

The cap is preferably formed from a polymeric material for convenience and economy. The material may be, for example, a polyolefin such as polypropylene, a polyamide, a polyester or a polycarbonate. Forming the cap from a polymeric material has the advantage that it can be formed conveniently by moulding (e.g., by injection moulding).

The formations on the sleeve at the first end thereof can conveniently be in the form of at least one tooth, arranged to form a groove in the surface of the object that is engaged by the sleeve as it shrinks. The tooth will generally extend continuously internally around the sleeve's circumference (this term is used equally in relation to sleeves with circular and non-circular cross-sections). Preferably, there are at least two of the teeth, axially spaced apart from one another. It is envisaged that the sleeve can be provided as a composite component. In this arrangement, the teeth can be provided on a liner located within the shape memory alloy component (e.g., as disclosed in GB Pat. No. 1,488,393). The formation on the sleeve at the second end thereof can conveniently be in the form of a screw thread, to engage a complimentary screw thread on a mating connector component.

In another embodiment, the formation on the sleeve at the second end thereof can comprise a convex surface which provides a ring-like line extending around the sleeve, which can form a line-to-surface seal with a surface on another object. The convex surface can be provided by an outwardly or inwardly flared end on the sleeve, in which the angle of the flare changes along the sleeve.

The alloy of the shape memory alloy sleeve is required to be capable of transforming between martensite and austenite phases. The alloy is selected according to the temperatures to which the sleeve will be exposed before, during and after installation, and to the physical requirements placed on the sleeve when in use. The alloy may be based on copper (e.g., as disclosed in U.S. Pat. No. 4,144,057 and U.S. Pat. No. 4,144,104), or more preferably on nickel-titanium (e.g., as disclosed in U.S. Pat. Nos. 3,753,700, 4,337,090, 4,565,589 or 4,770,725). A preferred method of treatment of a nickel titanium based shape memory alloy is disclosed in U.S. Pat. No. 4,740,253. The subject matter disclosed in these documents is incorporated in the specification of the present application by reference.

The thermal transformation hysteresis loop of certain shape memory alloys, particularly certain nickel titanium shape memory based alloys, is such that the alloys must be stored at temperatures significantly below ambient temperature to prevent transformation from the martensite phase to the austenite phase, with attendant change in configuration. This is generally achieved by submerging the alloy in liquid nitrogen. In the context of the present invention, the entire device may be submerged in a quantity of fluid, such as liquid nitrogen, to maintain the temperature of the sleeve below the $A_s$ temperature of the alloy.

FIG. 1 is a transverse view, partially in section, through a device according to the invention, prior to installation. FIG. 1 shows a device 2 for forming a connection to an elongated object such as a tube. The tube might, for example, be a high pressure line (such as a hydraulic line) in an aircraft, a ship or other vessel, or an automotive vehicle such as a car.

The device comprises a sleeve 4 which is formed from a nickel titanium based shape memory alloy such as a nickel titanium iron alloy as disclosed in U.S. Pat. No. 3,753,700 or a nickel titanium niobium alloy as disclosed in U.S. Pat. No. 4,770,725. It has inwardly projecting teeth 6 on its internal surface 8 towards its first end 10. It has a thread 12 on its external surface at its second end. A hexagonal portion 14 is provided between the first and second ends of the sleeve. Hexagonal portion 14 allows the sleeve to be gripped by means of a wrench or spanner.

The wall thickness of the sleeve 4 is less in the region in which the thread 12 is provided than in the region in which the teeth 6 are provided. This results from removal of the material of the sleeve so that the internal transverse dimension (the diameter where the sleeve is a circular cross-section) is greater at the second end than at the first end. This profile is created when the sleeve is in its configuration prior to the austenite to martensite phase change and expansion by which the sleeve is made shrinkable. Therefore, the amount of shrinkage that can be recovered when the phase of the alloy reverts to austenite is greater at the first end than at the second end. The sleeve has an appropriately configured face 15 at its second end for engaging a collar on another object, thus forming a sealed connection between the sleeve and that object.

An end cap 16 is provided on the second end of the sleeve 4. The end cap is formed from a polymeric material such as a polyamide. The cap has a thread 18 provided on its internal surface, which engages the thread 12 on the second end of the sleeve when the sleeve is in its expanded, heat-shrinkable configuration. A member 20 extends inwardly of the sleeve from the cap 16. The member has a stop 22 towards its free end. A plurality of inwardly deformable fingers 24 extend from the member, at its free end, each of which can be provided with a chamfer on its outward edge.

In use, a tube 30 (see FIG. 2) such as a hydraulic line in an aircraft which might be made from steel, titanium or aluminum, is inserted into the sleeve 4 through the first end 10. The end of the tube engages the ends of the fingers 24 on the member 20 and, aided by the chamfers on the ends of the fingers if present, causes the fingers to be deformed inwardly. The tube is pushed into the sleeve until its end engages the stop 22 on the member 20 so that the sleeve is correctly positioned relative to the end of the tube. The ends of the fingers engage the internal surfaces of the tube, and so tend to retain the sleeve and the tube in their correct relative positions.

The temperature of the alloy is made to increase so that the phase of the alloy changes from the martensite phase (in which the alloy exists while the sleeve is in its expanded configuration) to the austenite phase. If the $A_s$ temperature of the alloy is below ambient temperature, this can be achieved by removing the sleeve from the medium by which the alloy is maintained below the $A_s$ temperature of the alloy and exposing the sleeve to ambient temperature. The phase change of other alloys can be achieved by a heating step. The phase change of the alloy takes place with a change in configuration of the sleeve. This change is towards the configuration from which it was deformed when it was made heat shrinkable. However, the shrinkage of the sleeve is inhibited at the first end by the tube 26 (see FIG. 2) located within the sleeve. Consequently, as the sleeve shrinks, the teeth 6 on the internal surface of the sleeve engage the external surface of the tube and form a sealing connection by the formation of indentations or grooves in the surface of the tube. The force necessary to make this sealing connection is available because the tube prevents all of the available recovery of the sleeve from being recovered.

The amount of motion that is recoverable at the second end of the sleeve is less because of the reduced wall thickness of the sleeve at this point, and the effect of this on the shrinkage properties imparted to the sleeve when expanded to make it shrinkable. As a result of this, and possibly also in certain conditions of the fact that the stop 22 on the member 20 keeps the inserted end of the tube from the second end of the sleeve, the second end of the sleeve is able to shrink substantially completely to the original configuration from which it was deformed when it was made heat shrinkable. The configuration of the second end of the sleeve after shrinking can therefore be accurately controlled, substantially to the same degree as the process by which the sleeve is manufactured. This then makes it possible for a connection to be made between the sleeve and a nut 28, by means of the thread 12 on the sleeve and a cooperating thread on the nut (see FIG. 2).

Figure 2:
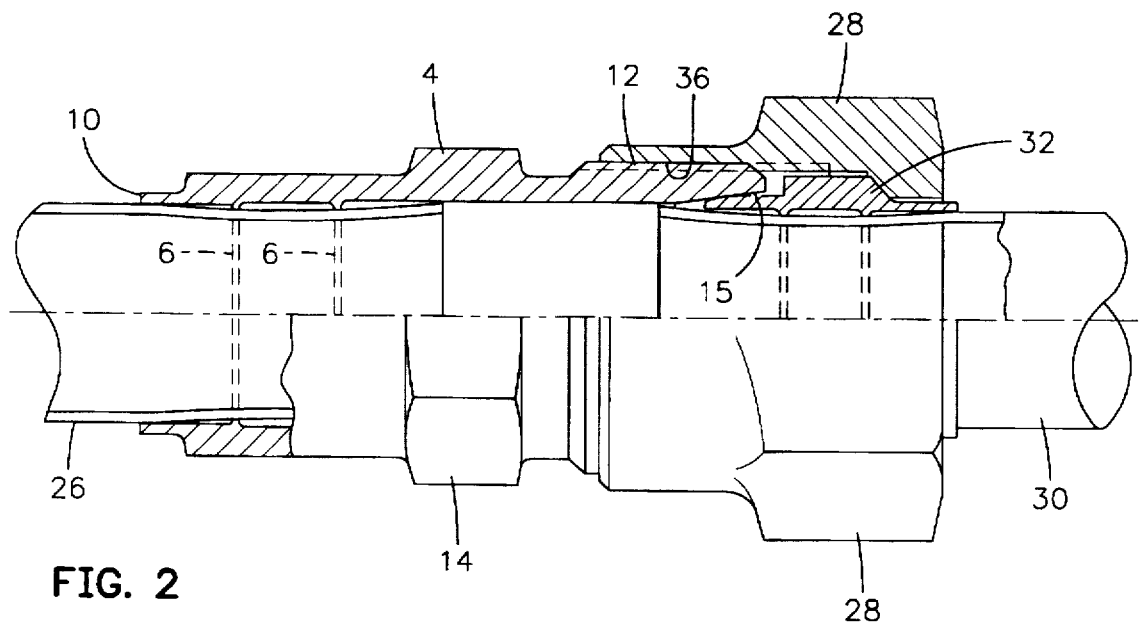
FIG. 2 is a transverse view, partially in section, through the device shown in FIG. 1, after installation on the end of a tube and in use to form a connection between that tube and another tube.

FIG. 2 is a transverse view, partially in section, through the device shown in FIG. 1, after installation on the end of a tube and in use to form a connection between that tube and another tube. FIG. 2 shows the sleeve 4 and tube 26 described above with reference to FIG. 1. The tube 26 is joined to a second tube 30 by means of a collar 32 formed from a shape memory alloy, which engages the external surface of the tube 26 as a result of having been shrunk onto that surface. In order to connect the tubes 26, 30 to one another, the end of the second tube is inserted into the second end of the sleeve (facilitated by the relatively large internal transverse dimension of the sleeve at the second end) until the collar 32 abuts the end face 15 of the sleeve. A nut 28, located on the second tube on the side of the collar 32, remote from the end of the tube, is then moved towards the sleeve until one end of the nut engages the collar, and the other end (the end closest to the sleeve and provided with an appropriate internal screw thread 36), engages the end of the sleeve, so that the threads 12, 36 can form a threaded connection between the nut 28 and the sleeve 4, and a seal between the second tube 30 and the sleeve 4 by means of the collar 32 located between them.

Dimensions of the device shown in FIG. 1 are as follows (in millimeters):

| Diameter A | | Diameter B | Length C |
|---|---|---|---|
| Machined | Expanded | | |
| 25.4 | 26.7 | 26.7 | 0.36A |

Figure 3:
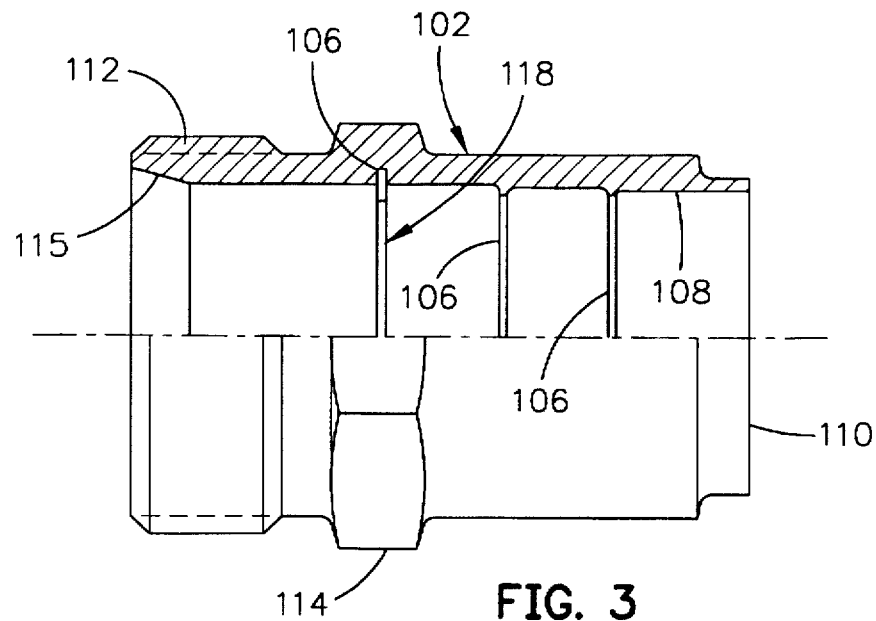
FIG. 3 is a transverse view, partially in section, through another embodiment of the device.

FIG. 3 is a transverse view, partially in section, through another embodiment of the device. The device shown in FIG. 3 comprises a sleeve 102 having inwardly projecting teeth 106 on its internal surface 108 towards its first end 110. It has a thread 112 on its external surface at its second end. A hexagonal portion 114 is provided between the first and second ends of the sleeve, by which the sleeve can be gripped by means of a wrench or spanner.

The sleeve has an appropriately configured face 115 at its second end for engaging a collar on another object, to form a sealed connection between the sleeve and that object. A groove 116 is provided in the internal surface of the sleeve 102. The groove houses a transversely compressible snap ring 118 which is positioned in the groove when the sleeve is in its expanded, shrinkable configuration. The ring is formed from a polymeric material; a polyester can be appropriate for many applications. The split in the ring is approximately radial (this term is to be applied appropriately to non-round articles as necessary), so that the ring can be compressed as the sleeve shrinks when its temperature increases. The ring provides a stop to limit the insertion of the end of a tube into the sleeve from the first end thereof, in the manner of the stop 22 on the member 20 in the device shown in FIG. 1.

Figure 4:
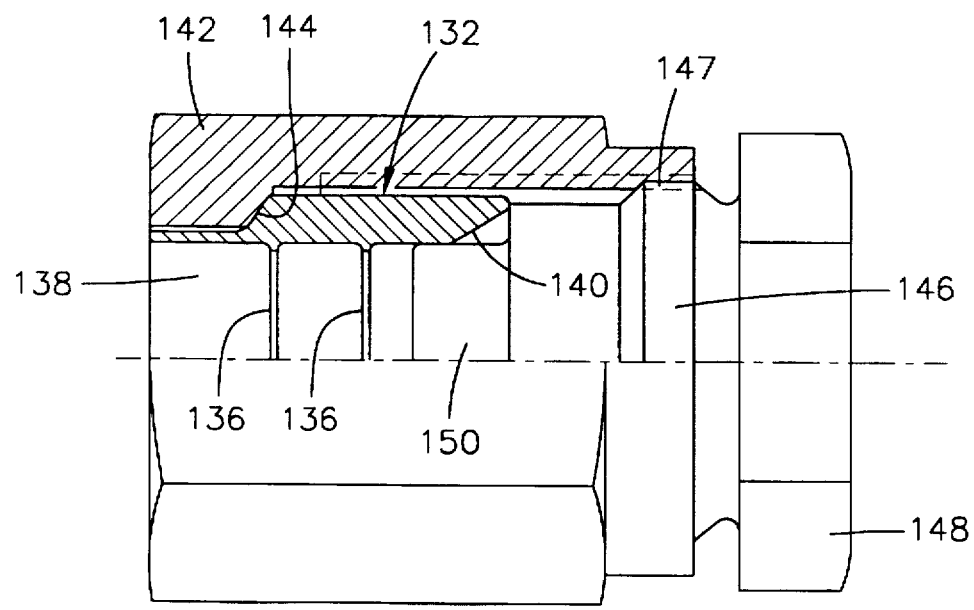
FIG. 4 is a transverse view, partially in section, through a further embodiment of the device.

FIG. 4 is a transverse view, partially in section, through a further embodiment of the device. FIG. 4 shows a device which comprises a sleeve 132 which is formed from a nickel titanium based shape memory alloy. It has inwardly projecting teeth 136 on its internal surface. The wall thickness of the sleeve varies between the location of the teeth where it is thickest and its two ends. At its non-coupling end, the wall thickness is relatively small over an appreciable length 138 of the sleeve, to provide strain relief when the sleeve is in use. At its second end, where a coupling is made between the sleeve and another object, the wall thickness reduces gradually to provide a mating surface 140 for forming a seal to another object in mating contact with the surface. The configuration of the end of the sleeve at which the thickness reduces gradually in this way is such that the end surface is convex when viewed in cross-section and provides a ring-like line extending around the sleeve, which can form a line-to-surface seal with a surface on another object. The reduction in thickness at the second end also enables the sleeve to recover fully at the second end to its predetermined configuration in which the seal to another object can be formed, without impediment by a tube positioned inside the sleeve in the direction of its recovery.

The connection between the sleeve and the other object can be made by means of a nut connector 142 which can act against the sleeve on a shoulder 144 pointing towards the first end of the sleeve, at the point at which its thickness changes from a small dimension (for strain relief) to the larger dimension in the region of the teeth. The nut can connect with a mating connector component to urge the sleeve in a direction away from the first end. A suitable nut can be provided with a screw thread by which it can mate with the mating connector component.

The sleeve 132 is fitted prior to use with an end cap 146 which is held in place by means of an external screw thread 147 which engages an internal thread on the nut connector 142. A hexagonal portion 148 on the end cap facilitates the engagement of the end cap with the nut. The end cap has an internally projecting member 150 which extends into the sleeve, to limit the insertion of a tube into the sleeve.

While a full and complete disclosure of the invention has been provided hereinabove, it will be obvious to those skilled in the art that various modifications and changes may be made.

What is claimed is:

1. A method of forming a connection to an elongate object, which comprises:
   (a) providing an object having an internal surface, an external surface and an end, and a device which comprises a sleeve formed from a shape memory alloy, the sleeve being transversely heat-shrinkable towards a recovered configuration, and having an internal surface, a first end with formations on the internal surface for forming a seal with the external surface of the object, and a second end which has a predetermined configuration when the sleeve is fully recovered in the absence of a restraint at the second end, in which it is capable of forming a connection to a second object;
   (b) positioning the object so that it is located within the first end of the sleeve; and
   (c) increasing the temperature of the sleeve to a temperature above the $A_s$ temperature of the shape memory alloy, to cause the sleeve to shrink transversely so that the end of the object located within the first end of the sleeve restricts the shrinkage of the sleeve at that end so that the formations on the internal surface of the sleeve engage the external surface of the object and form a seal between the sleeve and the object, the second end of the sleeve after completion of the shrinkage having the said predetermined configuration.

2. The method of claim 1, wherein the transverse internal dimension of said sleeve is greater at said second end than at said first end when said sleeve is in a fully unrestricted recovered configuration.

3. The method of claim 1, wherein, prior to increasing the temperature of said sleeve to cause said first end of said sleeve to shrink, the degree of shrinkage available in second end of said sleeve is less than that in said first end of said sleeve.

4. The method of claim 3, wherein, prior to increasing the temperature of said sleeve to cause said first end to shrink, said second end of said sleeve is substantially non-shrinkable.

5. The method of claim 1, wherein said device includes an internally projecting stop within said sleeve, and the method further including the step of locating the end of said object against said internally projecting stop.

6. The method of claim 5, wherein said internally projecting stop is provided by a transversely compressible member located positively axially within said sleeve.

7. The method of claim 1, wherein said sleeve has at least one formation at said second end of said sleeve.

8. The method of claim 7, wherein said formation comprises a screw thread.

9. The method of claim 7, wherein said formation comprises a surface, said surface being convex when viewed in cross-section and providing a ring-like line extending around said sleeve, said formation forming a line-to-surface seal with a surface on another object.

10. The method of claim 7, wherein said sleeve has a cap located on said second end of said sleeve by means of said formation.

11. The method of claim 10, wherein said cap includes at least one member which extends into said sleeve from said second end of said sleeve.

12. The method of claim 11, wherein said member provides a stop which is engaged by the end of said second object inserted into said sleeve from said first end of said sleeve, said sleeve being located relative to said end of said second object, the method further including the step of locating said end of said second object against said end of said member within said sleeve.

13. The method of claim 11, wherein said member has at least two fingers, said fingers being deformed transversely to engage a circumferentially extending surface of said object inserted into said sleeve from said first end of said sleeve.

14. A device for forming a connection to an elongate object having an external surface, comprising a sleeve which is formed from a shape memory alloy, which is transversely heat-shrinkable towards a recovered configuration, the sleeve having an internal surface, a first end with formations on the internal surface for forming a seal with the external surface of an object located within the sleeve, and a second end which has a predetermined configuration when fully recovered in the absence of a restraint at the second end in which it is capable of forming a connection to a second object, the degree of shrinkage available in the second end of the sleeve, prior to causing the sleeve to shrink, being less than in the first end of the sleeve.

15. The device of claim 14, wherein, prior to increasing the temperature of said sleeve to cause said first end of said sleeve to shrink, said second end of said sleeve is substantially non-shrinkable.

16. The device of claim 14, wherein the transverse internal dimension of said sleeve is greater at said second end than at said first end when said sleeve is allowed to recover freely.

17. The device of claim 14, wherein the thickness of the wall at said first end of said sleeve is greater than that at said second end by at least approximately 6%.

18. The device of claim 14, wherein said sleeve has at least one formation on its outer surface at said second end for engaging a mating connector component.

19. The device of claim 18, wherein said formation at said second end of said sleeve comprises a screw thread, said screw thread for engaging a complimentary screw thread on a mating connector component.

20. The device of claim 14, further comprising a cap located on said sleeve at said second end.

21. The device of claim 20, wherein said sleeve has at least one formation on the outer surface at said second end, and wherein said cap is retained on said sleeve by means of formations on said cap, said means of formations engaging said formations on said second end of said sleeve.

22. The device of claim 21, wherein said cap includes at least one member extending into said sleeve from said second end of said sleeve.

23. The device of claim 22, wherein said member provides a stop, said stop being engaged by the end of said object inserted into said sleeve from said first end, wherein said sleeve can be located relative to the end of said object.

24. The device of claim 22, wherein said member has at least two fingers, said fingers being deformed transversely to engage a circumferentially extending surface of said object inserted into said sleeve from said first end thereof.

25. The device of claim 21, wherein said formation comprises a convex surface providing a ring-like line extending around the sleeve, said formations forming a line-to-surface seal with a surface on said second object.

26. The device of claim 25, wherein said convex surface is provided by an inwardly directed conical surface.

27. The device of claim 14, wherein said formations at said first end of said sleeve comprise at least one tooth.

28. The device of claim 27, wherein said at least one tooth comprises at least two teeth, said teeth being axially spaced apart from one another.

29. The device of claim 14, further comprising an internally projecting stop within said sleeve, wherein said sleeve can be located relative to said end of said object located within said sleeve.

30. The device of claim 29, wherein said stop is provided by a transversely compressible member located positively axially within said sleeve.

31. The device of claim 14, wherein said sleeve has a shoulder on the outer surface, said shoulder being directed towards said first end of said sleeve, and wherein a nut member can act against said shoulder to urge said sleeve in a direction away from said first end.

32. A device for forming a connection to an elongate object having an external surface, which comprises:
(a) a sleeve formed from a shape memory alloy and being transversely heat-shrinkable towards a recovered configuration, the sleeve having an internal surface, a first end with formations on the internal surface for forming a seal with the external surface of an object located within the sleeve, and a second end which has a predetermined configuration when fully recovered in the absence of a restraint at the second end in which it can form a connection to a second object, and formations at the second end by which the connection to the second object can be made;
(b) an end cap having formations provided on it, the end cap being located on the sleeve at its second end, and retained on the sleeve by means of the formations on the end cap which engage the formations on the second end of the sleeve.

33. The device of claim 32, wherein said end cap includes at least one member extending into said sleeve from said second end of said sleeve.

34. The device of claim 33, wherein said member provides a stop, said stop being engaged by said end of said object inserted into said sleeve from said first end wherein said sleeve can be located relative to the end of said object.

35. The device of claim 33, wherein said member has at least two fingers, said deformed transversely to engage a circumferentially extending surface of said object inserted into said sleeve from said first end of said sleeve.

36. The device of claim 32, wherein the transverse internal dimension of said sleeve is greater at said second end than at said first end when said sleeve is in a recovered configuration.

37. The device of claim 32, wherein said sleeve has an axially facing surface on the outer surface of said sleeve, said axially facing surface being directed towards said first end of said sleeve, wherein a nut member can act against said axially facing surface to urge said sleeve in a direction away from said first end.

* * * * *